(12) United States Patent
Liang

(10) Patent No.: US 6,210,111 B1
(45) Date of Patent: Apr. 3, 2001

(54) TURBINE BLADE WITH PLATFORM COOLING

(75) Inventor: George P. Liang, Palm City, FL (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 09/217,144

(22) Filed: Dec. 21, 1998

(51) Int. Cl.$^7$ ........................................ F01D 5/18
(52) U.S. Cl. .................. 416/97 R; 416/97 A; 416/96 R; 415/115
(58) Field of Search ..................... 415/115, 116; 416/97 R, 97 A, 95, 96 R, 96 A

(56) References Cited

U.S. PATENT DOCUMENTS

| 3,182,955 | * | 5/1965 | Hyde | 416/96 R |
| 4,767,260 | * | 8/1988 | Clevenger et al. | 415/115 |
| 5,344,283 | * | 9/1994 | Magowan et al. | 415/115 |

* cited by examiner

Primary Examiner—F. Daniel Lopez
Assistant Examiner—Richard Woo
(74) Attorney, Agent, or Firm—Christopher T. Hayes

(57) ABSTRACT

A cooled turbine blade for a gas turbine engine having a platform cooling supply channel that supplies cooling air to a plurality of cooling holes in the surface of the blade platform adjacent the trailing edge of the blade.

4 Claims, 2 Drawing Sheets

TURBINE BLADE WITH PLATFORM COOLING

This invention was made under a U.S. Government contract and the Government has rights herein.

TECHNICAL FIELD

This invention relates to blades for use in gas turbine engines, and more specifically cooled blades used in the turbine section of such engines.

BACKGROUND OF THE INVENTION

Designers of gas turbine engines for aircraft are constantly trying to increase the thrust-to-weight ratio of their engines. This often results in higher engine operating temperatures and higher stresses in certain engine components, particularly in turbine blades. The combustor temperatures of high-performance gas turbine engines often exceed the melting temperature of the material from which turbine blades are manufactured.

To prevent failure of turbine blades in high-performance gas turbine engines, the turbine blades immediately downstream of the combustor incorporate internal cooling passages through which relatively cool air is passed to cool the blade to prevent the blade temperatures from rising to the combustor temperature. While cooling in this manner is effective at preventing blade failure, inadequate cooling at certain high stress locations of the turbine blade can cause cracks that can ultimately lead to blade failure. One such high stress location is where the trailing edge of the airfoil is joined to the blade platform.

Cooling air for the turbine blade is fed into the turbine blade from below the blade platform, through cooling passages in the blade root. One solution to the problem of cracking at the junction of the trailing edge and the blade platform would be to provide cooling holes in the platform immediately adjacent the trailing edge, and then providing a transverse cooling supply passage through the blade root to connect the cooling holes to the cooling passages in the blade root. Unfortunately, including such a transverse cooling passage in the blade root would weaken the blade while increasing the stress in part of the blade that is already highly stressed.

What is needed is a turbine blade in which the intersection of the airfoil trailing edge and the blade platform is cooled without significantly increasing the stress in the blade during engine operation.

SUMMARY OF THE INVENTION

It is therefore an object of the present invention to provide a turbine blade in which the intersection of the airfoil trailing edge and the blade platform is cooled without significantly increasing the stress in the blade during engine operation.

Accordingly, a cooled turbine blade is disclosed having a blade root, an airfoil including a leading edge and a trailing edge, a blade platform having a first surface, a second surface, a first side and a second side opposite and in spaced relation to the first side, a platform cooling supply channel, a plurality of cooling holes in the first surface, and a plurality of cooling passages. The second surface it is opposite the first surface and in spaced relation thereto, of the sides extend from the first surface to the second surface, the blade root is connected to the first surface. The airfoil is connected to the second surface, and the platform cooling supply channel extends from the first side to the second side through the blade platform. Each of the cooling holes communicates with the platform cooling supply channel through one of the cooling passages, and the platform cooling supply channel is substantially parallel to the second surface.

The foregoing and other features and advantages of the present invention will become more apparent from the following description and accompanying drawings.

BEST MODE FOR CARRYING OUT THE INVENTION

Figure 1:
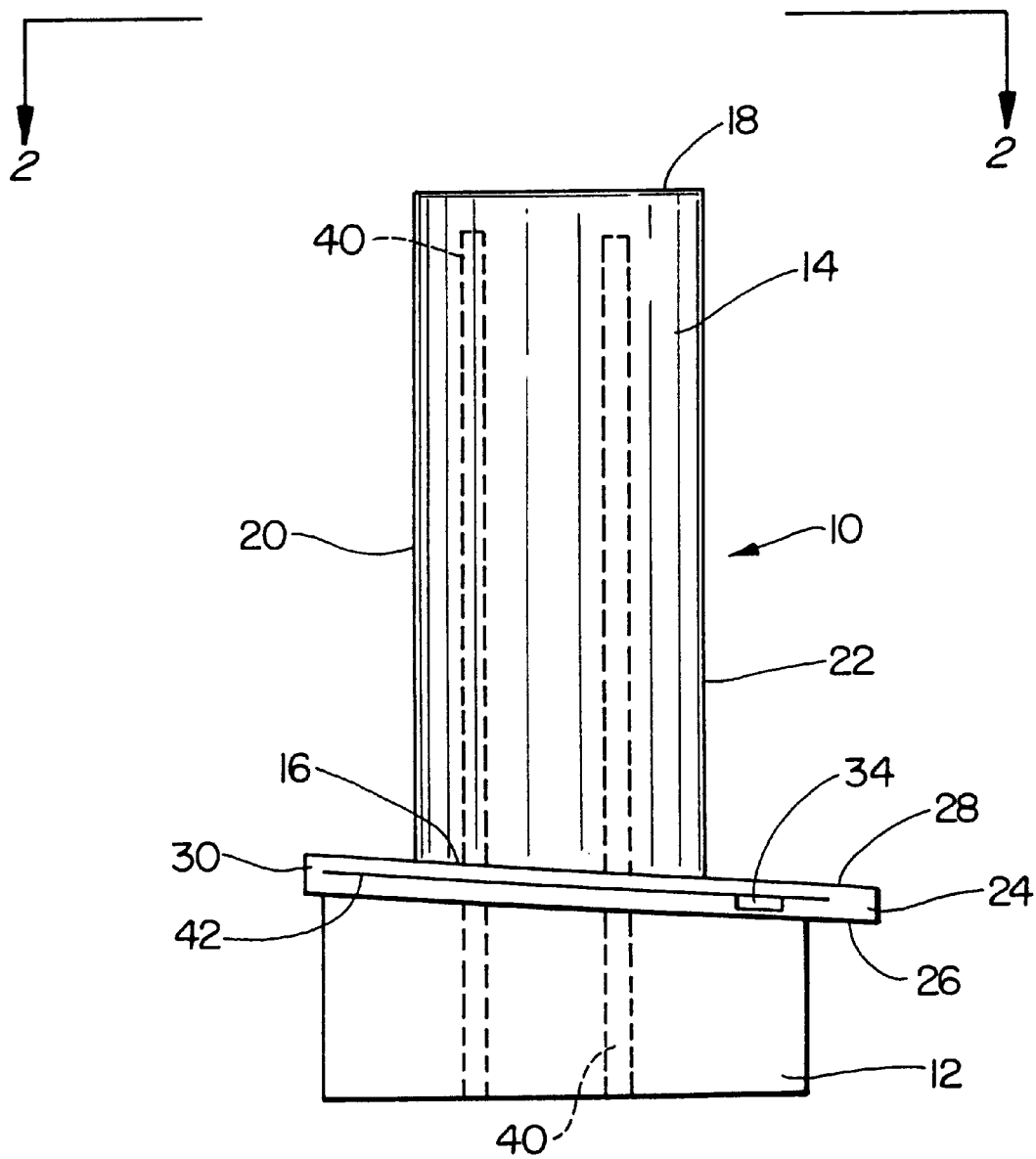
FIG. 1 is a plan view of the blade of the present invention

As shown in FIG. 1, the cooled turbine blade 10 of the present invention includes a blade root 12, and an airfoil 14. The airfoil 14 has a first end 16 in proximate the blade root 12, and a second end 18 opposite the first end 16. The airfoil 14 has a leading edge 20 and a trailing edge 22 extending from the first end 16 to the second end 18, and the trailing edge 22 is in spaced relation to the leading edge 20.

Figure 2:
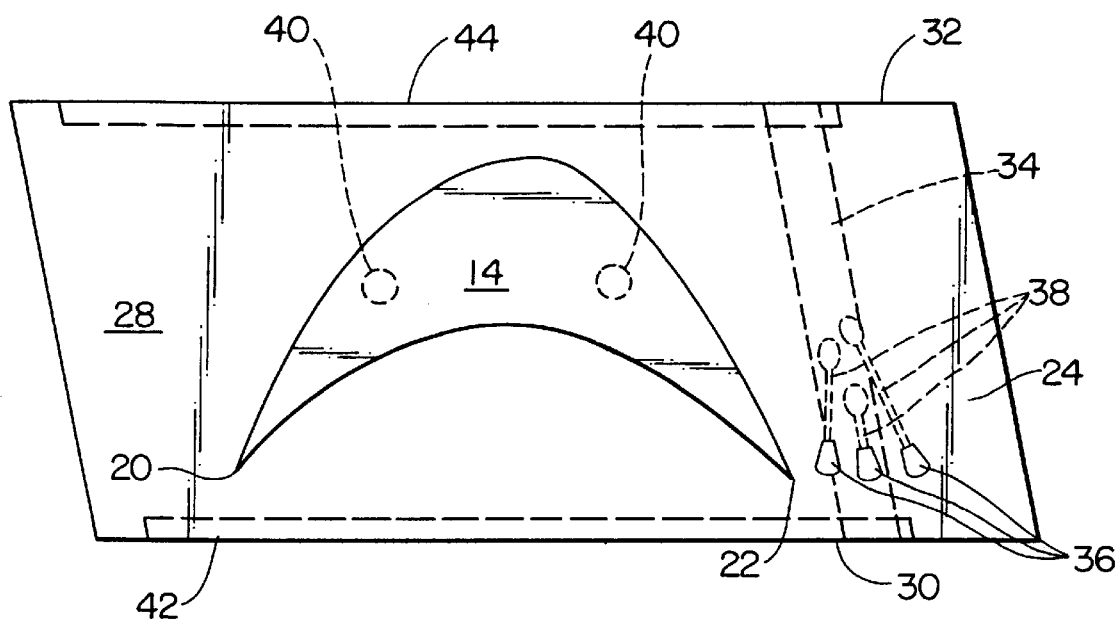
FIG. 2 is an end view-sectional view of the blade of the present invention taken along line 2—2 of FIG. 1.

A blade platform 24 connects the blade root 12 to the airfoil 14. The blade platform 24 has a first surface 26 and a second surface 28, and the first surface 26 is opposite, and in spaced relation to the second surface 28. As shown in FIGS. 1 and 2, the first side 30 extends from the first surface 26 to the second surface 28, and a second side 32 opposite, and in spaced relation to the first side 30, likewise extends from the first surface 26 to the second surface 28.

The blade root 12 is connected to the first surface 26 of the blade platform 24, and the first end 16 of the airfoil 14 is connected to the second surface 28 of the blade platform 24. A platform cooling supply channel 34 extends from the first side 30 to the second side 32 through the blade platform 24. A plurality of cooling holes 36 are incorporated into the second surface 28, and each of the cooling holes 36 is connected to the platform cooling supply channel 34 by one of a plurality of cooling passages 38. Accordingly, each of the cooling holes 36 communicates with the platform cooling supply channel 34 through one of the cooling passages 38. One or more airfoil cooling supply channels 40 extend from the blade root 12 up into the airfoil 14 to provide cooling air to the airfoil 14 during engine operation. As those in skilled in the art will readily appreciate, supplying cooling air from the airfoil 14 cooling supply channels 40 to the cooling holes 36 through a transverse passage would simultaneously weaken the root and increase the stress therein.

Referring again to FIGS. 1 and 2, the platform cooling supply channel 34 is substantially parallel to the second surface 28. The cooling holes 36 are located immediately adjacent the trailing edge 22, and the trailing edge 22 is in turn located immediately adjacent the first side 30. The first and second sides 30, 32 each include a slot 42, 44 for receiving a feather seal (not shown), and the platform cooling supply channel 34 communicates with each of the slots 42, 44. Those slots 42, 44, platform cooling supply channel 34, cooling holes 36, and cooling passages 38 may be cast into the blade platform 24, or they may be incorporated into the blade platform 24 using electro-discharge machining.

When the cooled blades 10 of the present invention are attached to the rim of a disk in a gas turbine engine, the blade platforms 24 of adjacent blades 10 contact each other along the first and second sides 30, 32 thereof, such that the first side 30 of each blade platform 24 is immediately adjacent the second side 32 of the blade platform 24 of an immediately adjacent blade 10. A feather seal of the type known in the art is received in, and extends between the slots 42, 44 of immediately adjacent first and second platform sides 30, 32, thereby minimizing cooling air leakage through the gap between immediately adjacent blade platforms 24. As those skilled in the art will readily appreciate, during engine operation cooling air supplied to the rim passes up to the feather seals and is directed into the platform cooling supply channel 34 of each blade 10.

The cooling air passes through the platform cooling supply channels 34 and into the cooling passages 38. The cooling air proceeds through the cooling passages 38 and into the cooling holes 36 in the second surface 28. From there, the cooling air flows out onto the second surface 28, where it provides film cooling of the blade platform 24 adjacent the trailing edge 22 of the airfoil 14. The cooling holes 36 are preferably shaped to slow the velocity of the cooling air exiting on to the second surface 28, so that mixing of the cooling air with the working fluid of the engine is minimized, and film cooling of the blade platform 24 adjacent the trailing edge 22 is maximized. As those skilled in the art will readily appreciate, although the cooling holes 36 of the present invention are located downstream of the trailing edge 22, the working fluid flowing around the airfoil 14 creates a vortex that carries the film of cooling air from the cooling holes 36 toward the trailing edge 22 of the airfoil 14. This in turn provides cooling for the airfoil trailing edge 22 where it joins the second surface 28 of the blade platform 24.

The cooled blade 10 of the present invention provides cooling of the trailing edge 22 of the airfoil 14 where it intersects the blade platform 24 without significantly increasing the stress in the blade 10 during engine operation. Additionally, the platform cooling supply channel 34 of the present invention reduces the overall weight of the blade 10 while at the same time reducing thermal gradients in the blade platform 24 by providing additional convective cooling of the blade platform 24.

Although this invention has been shown and described with respect to a detailed embodiment thereof, it will be understood by those skilled in the art that various changes in form and detail thereof may be made without departing from the spirit and scope of the claimed invention.

I claim:

1. A blade for use in a gas turbine engine, said blade comprising:

a blade root;

an airfoil having a first end, a second end opposite said first end and in spaced relation thereto, a leading edge, and a trailing edge in spaced relation to said leading edge, said leading and trailing edges extending from said first end to said second end;

a blade platform having a first surface, a second surface, a first side and a second side opposite and in spaced relation to said first side, a platform cooling supply channel, a plurality of cooling holes in the second surface, and a plurality of cooling passages, said second surface opposite said first surface and in spaced relation thereto, said sides extending from said first surface to said second surface, said blade root connected to said first surface, said first end of said airfoil connected to said second surface, said platform cooling supply channel extending from said first side to said second side through said blade platform, and each of said cooling holes communicates with said platform cooling supply channel through one of said cooling passages;

wherein said platform cooling supply channel is substantially parallel to said second surface.

2. The blade of claim 1 wherein said cooling holes are located immediately adjacent said trailing edge.

3. The blade of claim 2 wherein said trailing edge is located immediately adjacent said first side.

4. The blade of claim 3 wherein said first and second sides each include a slot for receiving a feather seal, and said platform cooling supply channel communicates with said slots.

\* \* \* \* \*